United States Patent [19]

Heubach

[11] 4,349,332

[45] Sep. 14, 1982

[54] CROWN VENTS

[75] Inventor: Edward C. Heubach, Newark, Ohio

[73] Assignee: Owens-Corning Fiberglas Corporation, Toledo, Ohio

[21] Appl. No.: 242,812

[22] Filed: Mar. 11, 1981

[51] Int. Cl.³ ............ F27D 17/00; C03B 5/16; F27F 19/00; F27B 7/00
[52] U.S. Cl. .................. 432/179; 65/337; 165/134 R; 432/193; 432/223
[58] Field of Search ............ 432/179, 193, 219, 223; 65/27, 135, 337; 165/134

[56] References Cited

U.S. PATENT DOCUMENTS 3,526,492  9/1970  Motsch .................... 65/337

FOREIGN PATENT DOCUMENTS 1165732 10/1958 France .................. 432/179

Primary Examiner—John J. Camby
Attorney, Agent, or Firm—Ronald C. Hudgens; Patrick P. Pacella; Philip R. Cloutier

[57] ABSTRACT

A combination comprising a recuperator, a crown vent and a furnace having a crown vent opening is supplied, the crown vent extending upwardly into the recuperator and downwardly beneath the wall of the crown vent opening.

6 Claims, 3 Drawing Figures

CROWN VENTS

TECHNICAL FIELD

This invention relates to apparatus and method for protecting furnace refractory.

In one of its more specific aspects, this invention is directed to a crown vent interposed between the junction of a melter crown and a recuperator.

BACKGROUND OF THE INVENTION

The employment of glass melters in the formation of liquid glass from which glass fibers are produced is well known. Such furnaces generally contain a bed of hot glass which is maintained as a fluid by any suitable heating means. During the melting of the batch from which the liquid glass is formed, various hot gases are formed which are vented from the furnace. As a heat conservation measure, these gases have been vented from a crown at the rearward portion of the furnace and passed through a recuperator for recovery of heat. However, certain difficulties are encountered with present equipment. Previous installations of this type permit the inspiration of ambient air at the juncture of the melter crown and the recuperator. This inspiration dilutes the waste gases with the result that the temperature of the hot waste gases is reduced and heat recovery therefrom is resultingly reduced. Further, the reduction in the temperature of the waste heat gases causes condensation of volatile fluxes which drip onto the brickwork of the crown vent opening with the result that deterioration of the refractory occurs.

STATEMENT OF THE INVENTION

These problems have been solved by the installation of the present invention such that there exists, in combination, a recuperator and the crown of a furnace, there being positioned therebetween a crown vent comprising a conduit having a lower section of a first diameter and an upper contiguous section of a second, smaller diameter, an air cooled conduit being positioned circumferentially of the upper section proximate the intersection between the lower section and the upper section.

The crown vent is positioned such that the lower section fits down into the crown opening and the upper section fits up into the entrance to the recuperator. The air cooled ring is adapted with suitable air inlet and outlet ports. The introduction of ambient air thereinto cools the flow of the liquid fluxes flowing downward from the recuperator into the furnace. The small diameter of the upper section causes a majority of the fluxes to drip directly into the glass melt below without any contact with the furnace refractory. The lower section extends below the hot face of the refractory and protects the refractory from any contact with the fluxes.

The crown vent can be fabricated from any suitable material. Preferably, it will be fabricated from a material such as Inconel ® 600, a nickel alloy which is corrosion-resistant to such fluxes as are encountered.
® Trademark of International Nickel

DRAWINGS

The apparatus of this invention will be more easily understood if explained in conjunction with the attached drawing in which:

FIG. 1 is an elevational view of the crown vent;

FIG. 2 is a plan view of the crown vent through Section 2—2 of FIG. 1; and

FIG. 3 is a detail, in elevation, of the installation of the crown vent between a recuperator and the crown of the furnace.

Figures 1, 2:
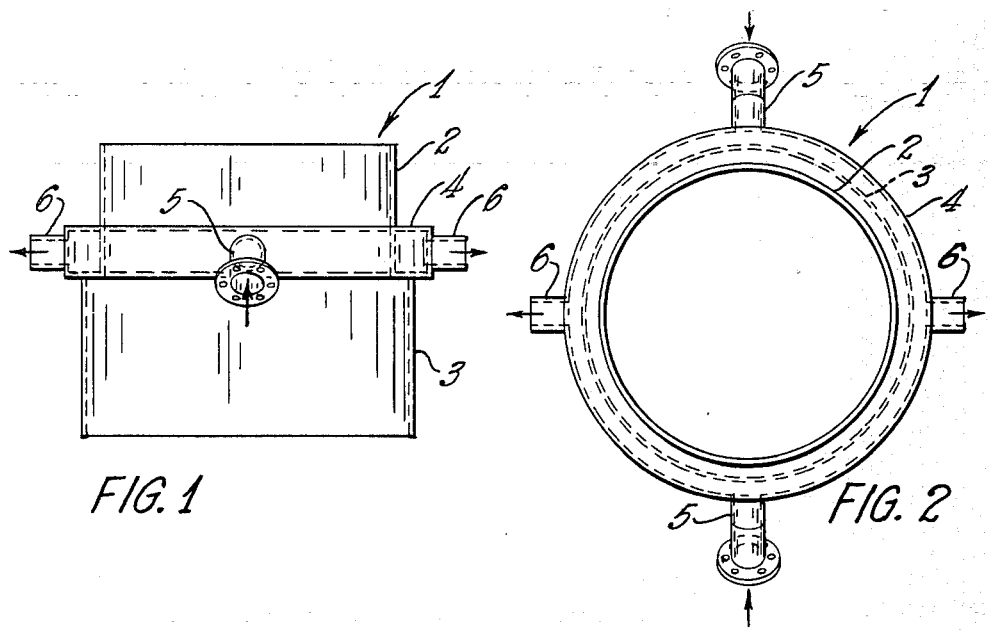
Referring now to FIGS. 1 and 2, there is shown crown vent 1 comprised of upper section 2 and lower section 3. Interposed between the upper and lower sections is air jacket 4.

Upper section 2 is of a smaller inside diameter than lower section 3 and is affixed to air jacket 4 by any suitable means, including welding. Preferably, the lower wall section of upper section 2 will form the inner wall section of air jacket 4.

Lower section 3 is also affixed to air jacket 4 such that no leakage occurs from within of the crown vent.

Air jacket 4 can be of any configuration although preferably it will be rectangular in cross-section. Similarly, it can be adapted with any suitable air inlet conduits 5 and air outlet conduits 6. Since the air inlet conduits are connected to an air inlet supply, they can be suitably flanged. Inasmuch as the air leaving the jacket can be vented to atmosphere, air outlet conduits can be constructed of nipples.

Figure 3:
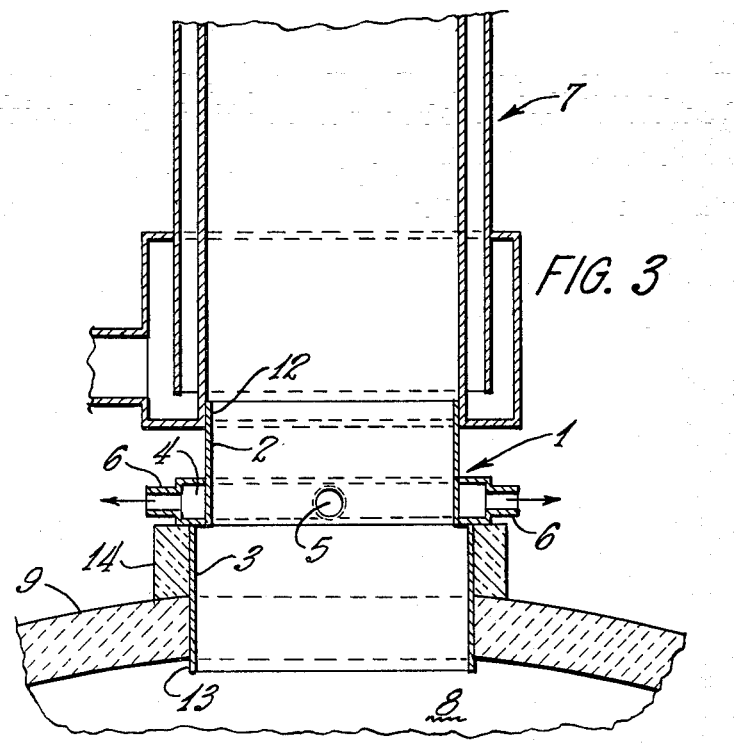

Referring now to FIG. 3, there is indicated the installation of the crown vent between a recuperator and the crown of the furnace.

Furnace 8 is adapted with refractory crown 9 comprised of refractory insulation. Positioned above the crown is recuperator 7, supported by means not shown. Positioned therebetween is crown vent 1.

The upper section 2 of the vent projects into the lower opening of the recuperator. The lower section 3 of the crown vent projects through the crown and the crown vent is positioned such that the lower end 13 of the lower section 3 extends downward beneath the inner wall 9 of the crown. In order to minimize any leakage around lower section 3 and the opening in the crown, insulation 14 can be installed to extend above the crown vent opening for the purpose of sealing the opening between the lower section and the opening in the crown and providing a support for the crown vent inasmuch as the air jacket 4 rests thereon in substantially sealing relationship.

It will be evident from the foregoing that various modifications can be made to the apparatus of this invention. Such, however, are considered within the scope of the invention.

I claim:

1. Apparatus comprising:
    (a) a recuperator;
    (b) a furnace having a crown opening in its upper wall; and,
    (c) a crown vent positioned therebetween comprising a conduit having a lower walled section of a first diameter and an upper contiguous walled section of a second diameter less than said first diameter and a conduit having a lowered wall positioned circumferentially of said upper section proximate the intersection of said upper and lower sections, the wall of said upper section forming the inner wall of said conduit and the wall of said lower section centrally and vertically intersecting the lower wall of said conduit.

2. The apparatus of claim 1 in which said upper section is positioned within said recuperator and said lower section is positioned in said crown opening.

3. The apparatus of claim 2 in which said lower section extends beneath the upper wall of said crown opening.

4. The apparatus of claim 3 in which said circumferentially positioned conduit is adapted with inlet and outlet conduit.

5. The apparatus of claim 4 in which said circumferentially positioned conduit is in contact with insulation extending above the crown opening.

6. The apparatus of claim 5 in which said circumferentially positioned conduit has a rectangular cross section.

* * * * *

UNITED STATES PATENT AND TRADEMARK OFFICE
CERTIFICATE OF CORRECTION

PATENT NO. : 4,349,332
DATED : September 14, 1982
INVENTOR(S) : Edward C. Heubach It is certified that error appears in the above—identified patent and that said Letters Patent is hereby corrected as shown below:

At column 2, line 47: After the word "relationship." there should be added the following: "As can be seen from FIGURE 1, the vertical wall of upper section 2 forms the inner wall of air jacket 4, and the vertical wall of lower section 3 centrally and vertically intersects the lower wall of air jacket 4. Accordingly, the wall of upper section 2 and the wall of lower section 3 lie in substantially parallel planes, the lower wall of jacket 4 horizontally connecting the two walls."

At column 2, line 62, the word "lowered" should be changed to "lower".

Signed and Sealed this

Seventh Day of February 1984

[SEAL]

Attest:

GERALD J. MOSSINGHOFF

Attesting Officer

Commissioner of Patents and Trademarks